US011159536B2

United States Patent
Kulkarni et al.

(10) Patent No.: US 11,159,536 B2
(45) Date of Patent: *Oct. 26, 2021

(54) SECURE ACCESS WITH TRUSTED PROXIMITY DEVICE

(71) Applicant: Samsung Electronics Co., Ltd, Suwon-si (KR)

(72) Inventors: Mahesh Kulkarni, Mountain View, CA (US); Laszlo Gombos, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

This patent is subject to a terminal disclaimer.

(21) Appl. No.: 16/679,064

(22) Filed: Nov. 8, 2019

(65) Prior Publication Data

US 2020/0076821 A1 Mar. 5, 2020

Related U.S. Application Data

(63) Continuation of application No. 15/611,647, filed on Jun. 1, 2017, now Pat. No. 10,498,742.

(51) Int. Cl.
*H04L 29/06* (2006.01)
*H04W 4/80* (2018.01)
*H04W 12/63* (2021.01)

(52) U.S. Cl.
CPC ........ *H04L 63/105* (2013.01); *H04L 63/0853* (2013.01); *H04L 63/102* (2013.01); *H04L 63/107* (2013.01); *H04W 4/80* (2018.02); *H04W 12/63* (2021.01); *H04L 2463/082* (2013.01)

(58) Field of Classification Search
CPC . H04L 63/105; H04L 63/0853; H04L 63/102; H04L 63/107; H04L 2463/082; H04W 4/80; H04W 12/63
USPC .......................................................... 726/4
See application file for complete search history.

(56) References Cited

U.S. PATENT DOCUMENTS

| | | | |
|---|---|---|---|
| 7,149,895 B1 * | 12/2006 | Asokan | G07F 7/1008 713/159 |
| 8,045,961 B2 | 10/2011 | Ayed et al. | |
| 8,112,066 B2 | 2/2012 | Ben Ayed | |
| 8,726,173 B2 | 5/2014 | Edwards et al. | |
| 10,075,847 B1 * | 9/2018 | Moreton | H04L 63/083 |
| 2003/0070091 A1 * | 4/2003 | Loveland | H04L 63/205 726/12 |
| 2004/0064701 A1 * | 4/2004 | O'Donoghue | H04L 63/102 713/175 |

(Continued)

FOREIGN PATENT DOCUMENTS

EP 2798565 A2 11/2014

*Primary Examiner* — Michael S McNally

(57) ABSTRACT

A method and system for security authorization on an electronic device are disclosed. The method includes detecting whether a trusted device is present in proximity to the electronic device. The trusted device is associated with a user profile of the electronic device, and the user profile includes access to private information. The method further includes allowing access to the user profile in response to detecting that the trusted device is present in proximity to the electronic device, and defaulting access to a public user profile of the electronic device in response to detecting a lack of presence of the trusted device in proximity to the electronic device.

18 Claims, 7 Drawing Sheets

(56) References Cited

U.S. PATENT DOCUMENTS

| | | | |
|---|---|---|---|
| 2005/0025125 A1* | 2/2005 | Kwan | H04L 63/10 370/352 |
| 2007/0094501 A1* | 4/2007 | Takamizawa | H04L 63/0861 713/170 |
| 2007/0226509 A1* | 9/2007 | Senga | G06K 9/00899 713/176 |
| 2008/0256536 A1* | 10/2008 | Zhao | G06F 21/57 718/1 |
| 2008/0294763 A1* | 11/2008 | Uchida | H04L 67/303 709/223 |
| 2009/0236410 A1* | 9/2009 | Noda | G06K 7/0008 235/375 |
| 2010/0071031 A1* | 3/2010 | Carter | G06F 21/32 726/2 |
| 2010/0161664 A1* | 6/2010 | Puhl | H04L 63/0861 707/781 |
| 2013/0133054 A1 | 5/2013 | Davis | |
| 2013/0174252 A1 | 7/2013 | Weber et al. | |
| 2013/0212654 A1* | 8/2013 | Dorfman | H04L 63/102 726/5 |
| 2014/0068751 A1* | 3/2014 | Last | H04L 63/083 726/16 |
| 2014/0344904 A1 | 11/2014 | Venkataramani et al. | |
| 2017/0085565 A1 | 3/2017 | Sheller | |
| 2017/0374046 A1 | 12/2017 | Narasimhan | |
| 2018/0020350 A1* | 1/2018 | Vissa | G06K 9/00006 |
| 2018/0115418 A1 | 4/2018 | Lakin | |

\* cited by examiner

SECURE ACCESS WITH TRUSTED PROXIMITY DEVICE

CROSS-REFERENCE TO RELATED APPLICATIONS

This application is a continuation of U.S. patent application Ser. No. 15/611,647, filed on Jun. 1, 2017, the disclosure of which is herein incorporated by reference in its entirety.

TECHNICAL FIELD

This disclosure relates generally to information security. More specifically, this disclosure relates to systems and methods for using the presence of trusted devices in proximity to an electronic device as an authentication factor for accessing profiles including private information on the electronic device.

BACKGROUND

Electronic devices are ever-present in daily life, and users of electronic devices often store sensitive private information on those devices. Users often share their mobile electronic devices, such as laptop computers and cellular phones, with friends and family for activities such as checking email accounts, searching for information on the internet, and the like. Stationary electronic devices, such as stationary computers, are also regularly shared by multiple users, for example by family members.

Some electronic devices or applications running on electronic devices support private user profiles that require authentication before the profile can be accessed, but in some cases the device or application may be unusable without authentication. In these cases users often share their devices after entering their authentication, thereby removing protection from their private user profiles before sharing. In other cases, applications may not have any privacy protection and may rely only on device level authentication for protection of the user's private information. For example, a browser application may save private information including account names and passwords and credit card numbers without any authentication required by the browser itself. Accordingly, if a user shares their device with a friend or family member to search the internet, they may not be able to prevent that friend or family member from using their saved passwords, credit card numbers, and the like.

SUMMARY

Embodiments of the present disclosure provide systems and methods for using the presence of trusted devices in proximity to an electronic device as an authentication factor for accessing profiles including private information on the electronic device.

In one embodiment, a method of security authorization is provided on an electronic device. The method includes detecting whether a trusted device is present in proximity to the electronic device, wherein the trusted device is associated with a user profile of the electronic device, and wherein the user profile includes access to private information. The method further includes allowing access to the user profile in response to detecting that the trusted device is present in proximity to the electronic device. The method further includes defaulting access to a public user profile of the electronic device in response to detecting a lack of presence of the trusted device in proximity to the electronic device.

In another embodiment, an electronic device is provided with a security authorization capability. The electronic device includes a processor, a transceiver, and a memory containing an application. The processor is configured to control the transceiver to detect whether a trusted device is present in proximity to the electronic device, wherein the trusted device is associated with a user profile of the electronic device, and wherein the user profile includes access to private information contained in the memory. The processor is further configured to control the application to allow access to the user profile in response to detecting that the trusted device is present in proximity to the electronic device. The processor is further configured to control the application to default access to a public user profile of the electronic device in response to detecting a lack of presence of the trusted device in proximity to the electronic device.

In yet another embodiment, a non-transitory computer readable medium embodying a computer program for security authorization is provided. The program code, when executed by at least one processor, causes the processor to detect whether a trusted device is present in proximity to the electronic device, wherein the trusted device is associated with a user profile of the electronic device, and wherein the user profile includes access to private information. The program code, when executed by the at least one processor, further causes the processor to allow access to the user profile in response to detecting that the trusted device is present in proximity to the electronic device. The program code, when executed by the at least one processor, further causes the processor to default access to a public user profile of the electronic device in response to detecting a lack of presence of the trusted device in proximity to the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
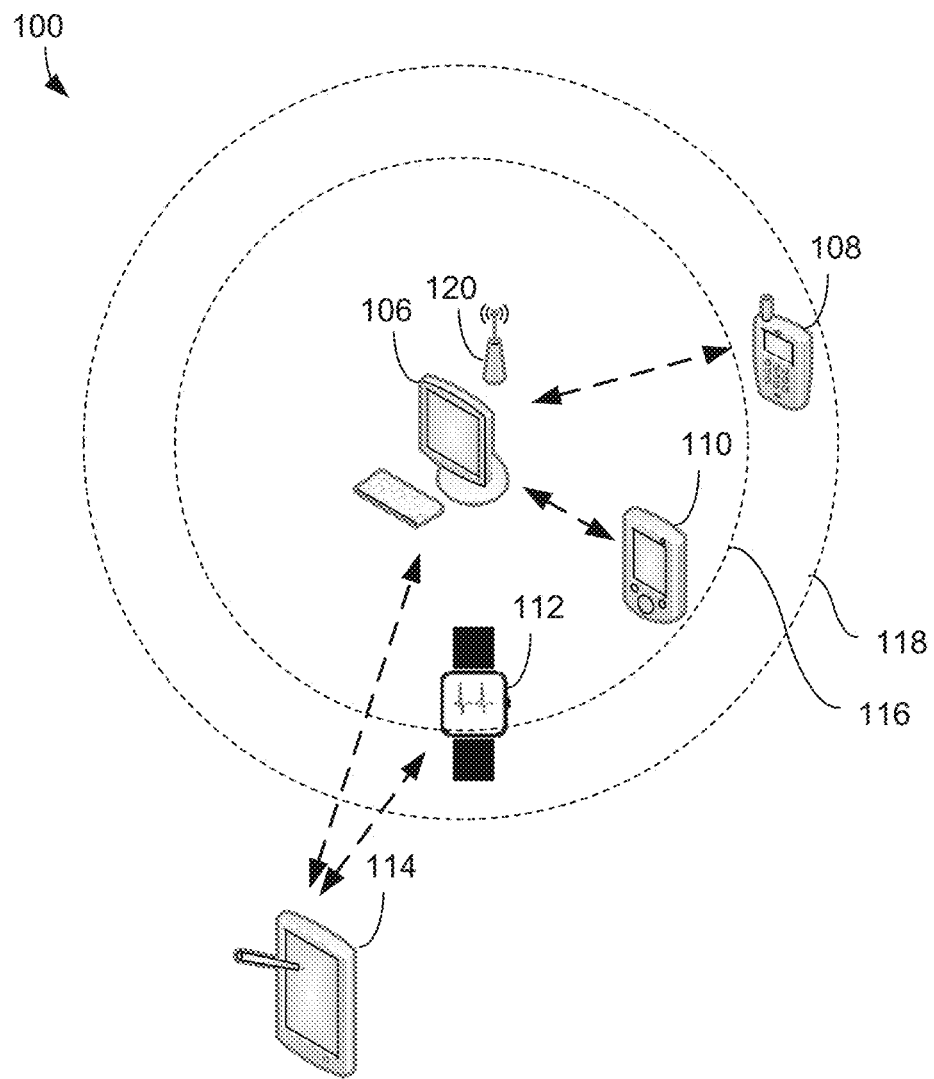
FIG. 1 illustrates an example computing system according to various embodiments of this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the computing system 100 includes various electronic devices 106, 108, 110, 112, and 114. Each electronic device 106-114 represents any suitable computing or processing device that interacts with at least one other computing device(s). In this example, the electronic devices 106-114 include a stationary computer 106, a mobile phone 108, a virtual or augmented reality wearable device 110, a smartwatch 112, and a tablet computer 114. In some embodiments, the smartwatch 112 may be another wearable device such as a fitness tracker. However, any other or additional electronic devices could be used in the computing system 100.

In this example, some electronic devices 106-114 communicate with other electronic devices 106-114. For example, the electronic devices 108 and 110 communicate directly with the stationary computer 106, and the smartwatch 112 communicates directly with the tablet computer 114, for example using Bluetooth®, Wi-Fi Direct®, near-field communication (NFC) or other short range wireless communication protocols. Note that these examples are for illustration only and that each electronic device could communicate directly with any other electronic device via any suitable communication method.

As described in more detail below, some of electronic devices 106-114 may function as trusted devices that serve as authentication factors when communicating directly with other electronic devices 106-114. For example, mobile phone 108, virtual or augmented reality wearable device 110, and tablet computer 114 may serve as authentication factors when communicating directly with stationary computer 106, while smartwatch 112 may serve as an authentication factor when communicating directly with tablet computer 114. For the sake of simplicity, the set of electronic devices 106 will be used as the primary electronic device for further explanation of the functions of computer system 100. Stationary computer 106 may additionally detect whether mobile phone 108 and virtual or augmented reality wearable device 110, functioning as trusted devices, are present within a proximity 116 or 118 to the stationary computer 106, while tablet computer 114, also functioning as a trusted device, is not detected by stationary computer 106 because it is outside of proximities 116 and 118. In some embodiments, electronic devices such as smartwatch 112 may be within proximity 116 or 118 of the stationary computer 106, but may not be programmed to function as a trusted device for stationary computer 106.

The computing system 100 may further include at least one beacon 120. In some embodiments, the beacon 120 is a Bluetooth® low energy (BLE) beacon. As described in further detail below, the beacon 120 communicates with the electronic devices 106, 108, 110, 112, and 114 to facilitate estimation of the distance of the electronic devices 108, 110, 112, and 114 from the beacon 120. In some embodiments, the beacon 120 may be co-located with the stationary computer 106 so that an estimation of the distance of the electronic devices 108, 110, 112, and 114 from the beacon 120 is substantially the same as an estimation of the distance of the electronic devices 108, 110, 112, and 114 from the stationary computer 106. This may facilitate determination of whether an electronic device 108, 110, 112, or 114 is within a predetermined distance of the stationary computer 106 (e.g., within proximity 116 or 118).

Although FIG. 1 illustrates one example of a computing system 100, various changes may be made to FIG. 1. For example, the computing system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2A:
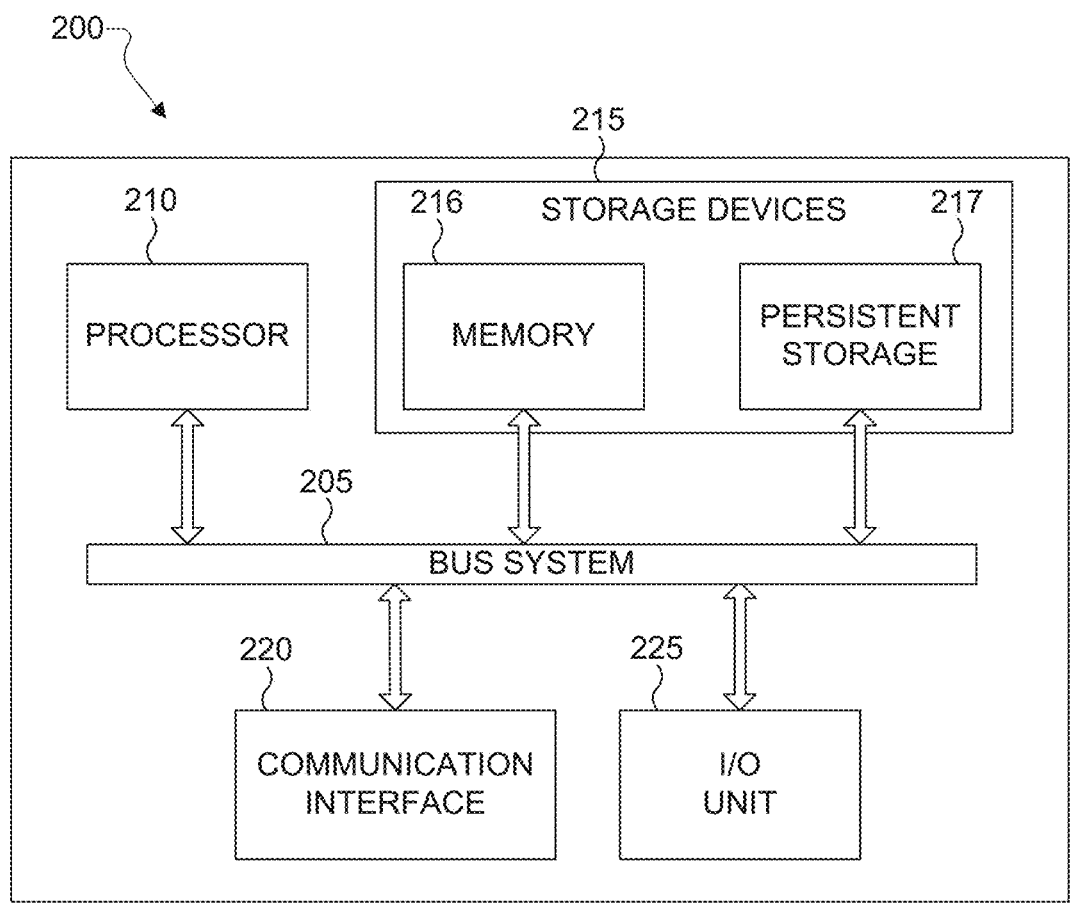
FIGS. 2A-2B illustrate example electronic devices in a computing system according to various embodiments of this disclosure.
Figure 2B:
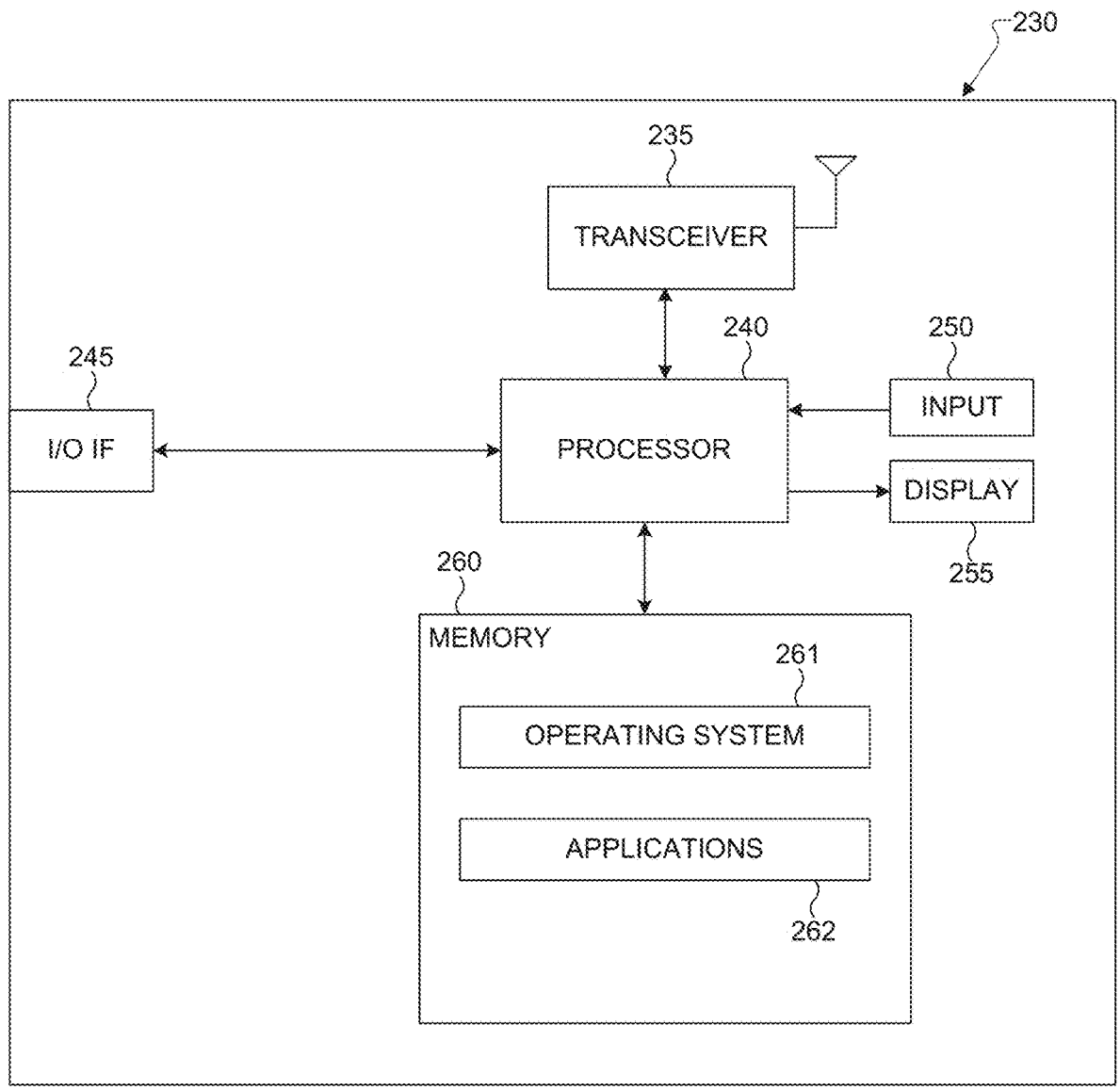

FIGS. 2A and 2B illustrate example devices in a computing system 100 according to this disclosure. For example, the electronic device 200 could represent the stationary computer 106 or the tablet computer 114 in FIG. 1. The trusted device 230 could represent one or more of the electronic devices 108-117, such as a smartwatch 112, in FIG. 1.

As shown in FIG. 2A, the electronic device 200 includes a bus system 205, which supports communication between at least one processor 210, at least one storage device 215, at least one communication interface 220, and at least one input/output (I/O) unit 225.

The processor 210 executes instructions that may be loaded into a memory 216. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 216 and a persistent storage 217 are examples of storage devices 215, which represent any structure(s) capable of storing and facilitating retrieval of information (such as data, program code, and/or other suitable information on a temporary or permanent basis). The memory 216 may represent a random access memory or any other suitable volatile or non-volatile storage device(s). The persistent storage 217 may contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102. In other embodiments, the communication interface 220 could include a wireless transceiver facilitating communications directly with one or more of the electronic devices 106-114 in system 100. The communication interface 220 may support communications through any suitable physical or wireless communication link(s). In some embodiments, the communication interface 220 includes a short-range wireless-communication device, such as for example, a Wi-Fi Direct® transceiver, an NFC transceiver, a Bluetooth® transceiver, or a Bluetooth® low energy (BLE) beacon. In other embodiments, the communication interface 220 may be connected to an externally located short-range wireless-communication device, such as for example, a Wi-Fi Direct® transceiver, an NFC transceiver, a Bluetooth® transceiver, or a Bluetooth® low energy (BLE) beacon.

The I/O unit 225 allows for input and output of data. For example, the I/O unit 225 may provide a connection for user input through a keyboard, mouse, keypad, touchscreen, or other suitable input device. In some embodiments, the I/O unit 225 may provide a connection for the beacon 120, which may be a BLE beacon. The I/O unit 225 may also send output to a display, printer, or other suitable output device.

As shown in FIG. 2B, the trusted device 230 includes a transceiver 235, a processor 240, an input/output (I/O) interface (IF) 245, an input interface 250, a display 255, and a memory 260. The memory 260 includes an operating system (OS) program 261 and one or more applications 262.

The transceiver 235 receives, from an antenna, an incoming signal transmitted by another component in a system. In some embodiments, the received signal may be a short wave signal, for example, a Bluetooth®, Wi-Fi Direct®, NFC, or other signal, and the transceiver 235 may include appropriate hardware for sending and receiving the short range signals. In some embodiments, the incoming signal may be an RF signal. The transceiver 235 performs front end processing of the received signal, for example down-conversion of an incoming RF signal to generate an intermediate frequency (IF) or baseband signal. The IF or baseband signal is processed by filtering, decoding, and/or digitizing the baseband or IF signal. The transceiver 235 transmits the processed baseband signal to the processor 240 for further processing (such as for authentication data).

In some embodiment, the transceiver 235 additionally receives outgoing baseband data (such as web data, e-mail, interactive video game data, or authentication request data) from the processor 240. The transceiver 235 encodes, multiplexes, and/or digitizes the outgoing baseband data to generate a processed baseband or IF signal. The transceiver 235 up-converts the baseband or IF signal to a signal that is transmitted via the antenna.

The processor 240 can include one or more processors or other processing devices and execute the OS program 261 stored in the memory 260 in order to control the overall operation of the electronic device 200. For example, the processor 240 could control the reception of forward channel signals and the transmission of reverse channel signals by the transceiver 235 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor 240 is also coupled to the I/O interface 245, which provides the electronic device 200 with the ability to connect to other devices such as laptop computers and handheld computers. The I/O interface 245 is a communication path between these accessories and the processor 240.

The processor 240 is also coupled to the input interface 250 and the display 255. The operator of the electronic device 200 can use the input interface 250 to enter data into the electronic device 200. The display 255 may be a liquid crystal display or other display capable of rendering text and/or at least limited graphics, such as from web sites.

The memory 260 is coupled to the processor 240. Part of the memory 260 could include a random access memory (RAM), and another part of the memory 260 could include a Flash memory, other read-only memory (ROM), or other non-transitory memory.

Although FIGS. 2A and 2B illustrate examples of devices in a computing system, various changes may be made to FIGS. 2A and 2B. For example, various components in FIGS. 2A and 2B could be combined, further subdivided, or omitted and additional components could be added according to particular needs. As a particular example, the processor 210 of FIG. 2A or the processor 240 of FIG. 2B could each be divided into multiple processors, such as one or more central processing units (CPUs) and one or more graphics processing units (GPUs). As another example, while FIG. 2A illustrates the electronic device 200 as a stationary computer, electronic devices 200 could be configured to operate as other types of mobile or stationary devices, such as a tablet computer or mobile phone. Also, while FIG. 2B illustrates the trusted device 230 configured as a smartwatch, trusted devices 230 could be configured to operate as other types of mobile or stationary devices, such as a stationary computer. In addition, as with computing and communication networks, electronic devices can come in a wide variety of configurations, and FIG. 2 does not limit this disclosure to any particular electronic device.

Figure 3:
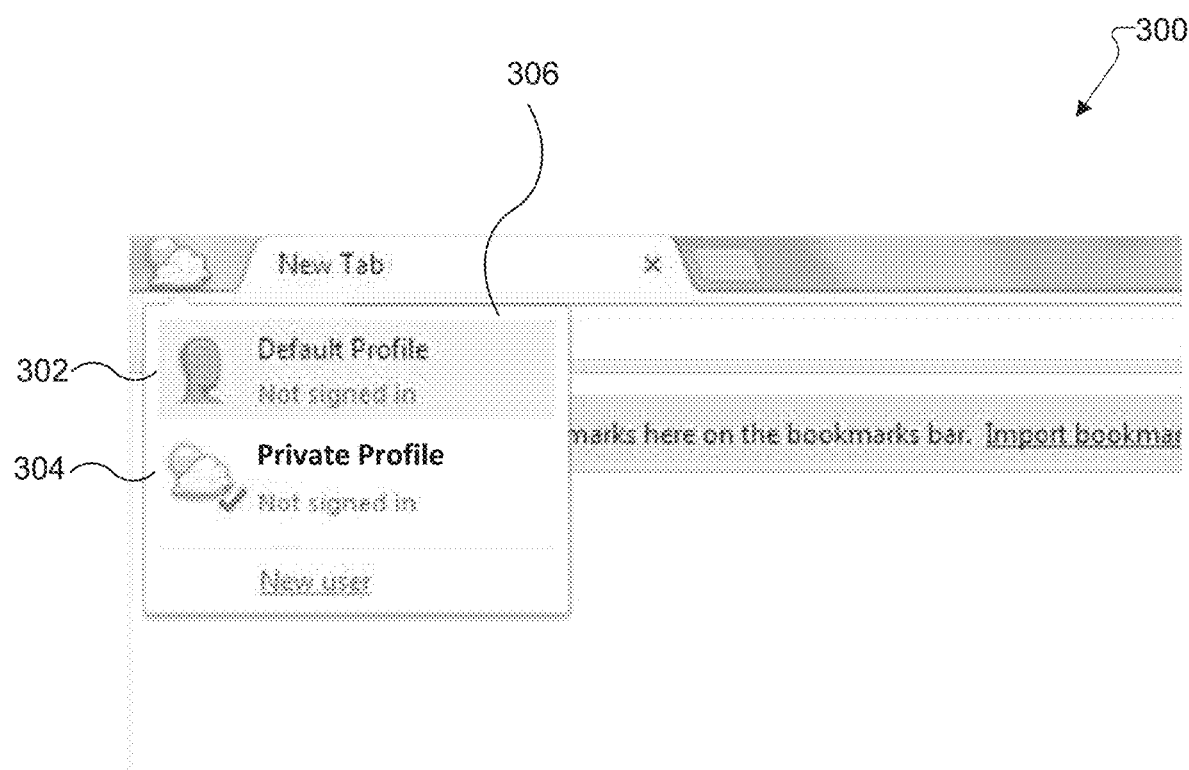
FIG. 3 illustrates an example application running on an example electronic device.

FIG. 3 illustrates an example application 300 running on an electronic device 200, such as the stationary computer 106. The application 300 includes user profiles 302 and 304, and at least one of the user profiles 304 is a private user profile and one of the user profiles 302 is a default, or public, user profile. In this example, the application 300 is an internet browser, but it is understood that any other application may implement a similar user profile system. Furthermore, it is understood that the application 300 may be an operating system or other high level application that operates in the background and provides the below functionality to other applications running simultaneously.

The default user profile 302 may refrain from recording any information that could be sensitive. For example, no (or limited) browsing history, cookies, cache data, location information, saved passwords, saved credit card data, or the like may be stored or accessed by the application 300 while the default user profile 302 is logged in. Alternatively, such sensitive information may be temporarily stored and accessed by the application 300, and deleted when the application 300 is exited, or after a predetermined amount of time has passed without any user input to the application.

The private user profile 304 may have associated with it sensitive information. This sensitive information may be related to the creator of the private user profile 304, or to any other users that have accessed the private user profile 304. For example, the private user profile 304 may store credit card information (e.g., credit card number, expiration date, cardholder name), address information, account names and passwords for other services accessible from the application (e.g., for web sites accessed with an internet browser), usage history of the application (e.g., browsing history, cookies, cache, bookmarks, or installed extensions on an internet browser), or the like. This sensitive information may be stored, for example, in a memory 260 of the electronic device 200.

Upon creation of the private user profile 304 the creator will be prompted to associate one or more authentication factors with the private user profile 304 to protect it from access by other users. These authentication factors may include a password, biometric data (e.g., a fingerprint, voice print, or iris scan), a security token, a trusted device, or the like. In some embodiments, a combination of two or more authentication factors may be associated with the private user profile 304 to create a multifactor authentication requirement. A trusted device 230 may be another electronic device 200, such as mobile phone 108, virtual or augmented reality wearable device 110, smartwatch 112, or tablet computer 114. The trusted device 230 may communicate with the electronic device 200 running application 300 by short range wireless communication, for example, via Bluetooth®, Wi-Fi Direct®, or NFC.

The creator of the private user profile 304 preferably associates a device that they regularly carry with them as a trusted device 230. Alternatively, the creator may use a device that is tied to a specific location as a trusted device 230. A unique identifier of the trusted device 230 may be provided by the trusted device 230 upon connection with the electronic device 200, and may serve as the authentication factor. It is understood that different private user profiles 304 may have different authentication factors associated with them, including different trusted devices 230. It is also understood that more than one trusted device 230 may be associated with a private user profile 304, and that one trusted device 230 may be associated with more than one private user profile 304.

A user of the electronic device 200 may, upon opening the application 300, be prompted to select a user profile. Alternatively, the application may automatically select a default user profile 302 which does not have access to any private user information, but which does not require any authentication before use. If the user selects a private user profile 304, the application 300 may prompt the user to provide authentication factors, such as a password, biometric data, or a security token, before allowing access to the private user profile 304.

Alternatively or additionally, upon selection of a private user profile 304 the application 300 may automatically detect that a trusted device 230 associated with the private user profile 304, such as mobile phone 108, is within a proximity 118 of the electronic device 200, such as the stationary computer 106, and use the presence of the trusted device 230 as an authentication factor. For example, the application 300 may cause the electronic device 200 to search for trusted devices 230 using short range wireless communications technologies such as Bluetooth®, Wi-Fi Direct®, or NFC.

In some embodiments, upon opening, the application 300 via the electronic device 200 automatically searches for trusted devices 230 within a predetermined proximity (e.g., proximity 116 or 118) to the electronic device 200. Upon detecting a trusted device 230 (or two or more trusted devices 230 in the case of a multifactor authentication), the application 300 or electronic device 200 determines whether a private user profile 304 is associated with the trusted device 230 and, if so, logs into the private user profile 304 in the application 300 and authenticates the login.

After authenticating, the application 300 runs with access to all sensitive information that is associated with the private user profile 304. For example, an internet browser application 300 may have access to bookmarks, cookies, and browsing history of the private user profile 304. Additionally, the browser may have access to stored account names and passwords for various website accounts, and to stored credit card information. Authentication thereby allows the user to conveniently store often used sensitive information on their device while offering protection of the sensitive information with a minimum of inconvenience.

In some embodiments, a menu 306 in the application 300 allows a user to select a user profile to log into at any time while using the application 300. For example, if the application 300 opens with a default user profile 302 logged in, the user may access the menu 306 and choose to log into a different user profile, for example private user profile 304, as described above. The menu 306 may provide various identifying information of the private user profile 304, such as a name designated by the creator of the profile, the name of the creator of the profile, an email address associated with the profile, or the like. The menu 306 may additionally provide an option to create a new private user profile 304, as described above. It is understood that although the example of FIG. 3 shows one private user profile 304, any number of private user profiles 304 may exist within application 300.

In other embodiments, when the user opens the menu 306 to select a profile the application 300 may cause the electronic device 200 to search for trusted devices 230 as described above. In this case the application 300 may automatically select a private user profile 304 associated with a detected proximate trusted device 230, or may suggest selection of the private user profile 304. For example, the menu 306 may visually highlight the private user profile 304 associated with the detected trusted device 230.

In some cases, multiple trusted devices 230 may be detected in proximity to the electronic device 200 (e.g., electronic devices 108-112, which are within proximity 118). If more than one of these trusted devices 230 is associated with a private user profile 304 (e.g., if mobile phone 108 and virtual or augmented reality wearable device 110 are each associated with a different private user profile 304), the application 300 may prompt the user to select from among these profiles, or may suggest these profiles to the user (e.g., by visually highlighting the profiles in the menu 306).

The application 300 may prompt the user for an additional authentication factor when a private user profile 304 is selected or suggested by the application 300 based on the proximity of a trusted device 230. For example, the application 300 may prompt the user to enter a password, scan a fingerprint, scan their iris, or the application 300 may cause the trusted device 230 associated with the private user profile 304 to display a confirmation dialog (e.g., "Please confirm login to account") that the user can respond to (e.g., by activating a button on the trusted device 230 or by entering a password into an interface on the trusted device 230) to confirm the authentication. The trusted device 230 may have a companion application installed to communicate with the application 300 to perform the confirmation function, or this capability may be built into the operating system of the trusted device 230. In some embodiments, the user may not be requested to respond to a confirmation dialog on a trusted device 230 when only one trusted device 230 is detected in proximity to the electronic device 200.

The user may, however, be requested to respond to a confirmation dialog on a trusted device 230 when more than one trusted device 230 (e.g., mobile phone 108 and virtual or augmented reality wearable device 110) is detected and the user has selected from among multiple private user profiles 304 associated with multiple proximate trusted devices 230. In this way, if two users have created private user profiles 304 within application 300 and have associated their respective trusted devices 230 with their private user profiles 304, one of those users will not be able to log into the other user's private user profile 304 simply because the other user has walked within proximity 118 to the electronic device 200. Alternatively, a second user who is within proximity 118 to the electronic device 200 may choose to allow a first user who is using electronic device 200 to access the second user's private user profile 304 by providing the requested confirmation through their trusted device 230.

In another embodiment, the application 300 via the electronic device 200 may limit detection of trusted devices 230 for the purposes of authentication to a smaller proximity than the communication technology used for the detection allows for. For example, a Bluetooth® connection may have a maximum range that coincides with proximity 118 to electronic device 200, for example the stationary computer 106, allowing for communication with both the mobile phone 108 and the virtual or augmented reality wearable device 110, but the stationary computer 106 may choose only to detect trusted devices 230 within predetermined proximity 116 to the stationary computer 106 for authentication of a login to a private user profile 304. Accordingly, in this case the virtual or augmented reality wearable device 110 may be used to authenticate login to a private user profile 304 associated with the virtual or augmented reality wearable device 110, but the mobile phone 108 may not be used to authenticate login to a private user profile 304 associated with the mobile phone 108.

In some embodiments, a beacon 120 may facilitate distance estimation to determine whether the electronic devices such as mobile phone 108 or virtual or augmented reality wearable device 110 are within a predetermined distance of the stationary computer 106 (e.g., within proximity 116). The beacon 120 may facilitate distance estimation based on received signal strength indication (RSSI). For example, the beacon 120 may broadcast an indication of initial signal strength, and a device such as mobile phone 108 or virtual or augmented reality wearable device 110 may compare the received signal strength with the indicated initial signal strength to estimate distance from the beacon 120. In such an embodiment, the beacon 120 may be co-located with the stationary computer 106 so that distance from the beacon 120 is roughly equivalent to distance from the stationary computer 106. In some embodiments, three or more beacons 120 may be used to facilitate distance estimation using triangulation. For example, an RSSI measurement taken from each beacon 120 may be taken to estimate the distance from an electronic device such as mobile phone 108 to each beacon 120, and the set of distances may be used to determine a location a location of the mobile phone 108 relative to the three or more beacons 120.

Similarly, the application 300 or the electronic device 200 may limit detection of trusted devices 230 by the use of directional communications (e.g., beamforming). For example, the application 300 may only allow the use of trusted devices 230 that are positioned in front of a display of the stationary computer 106 to be used to authenticate login to private user profiles 304. In this way, even if a user is standing directly behind or to the side of the stationary computer 106, their trusted device 230 cannot be used to authenticate a login to an associated private user profile 304 by another user that is operating the electronic device 200.

Figure 4:
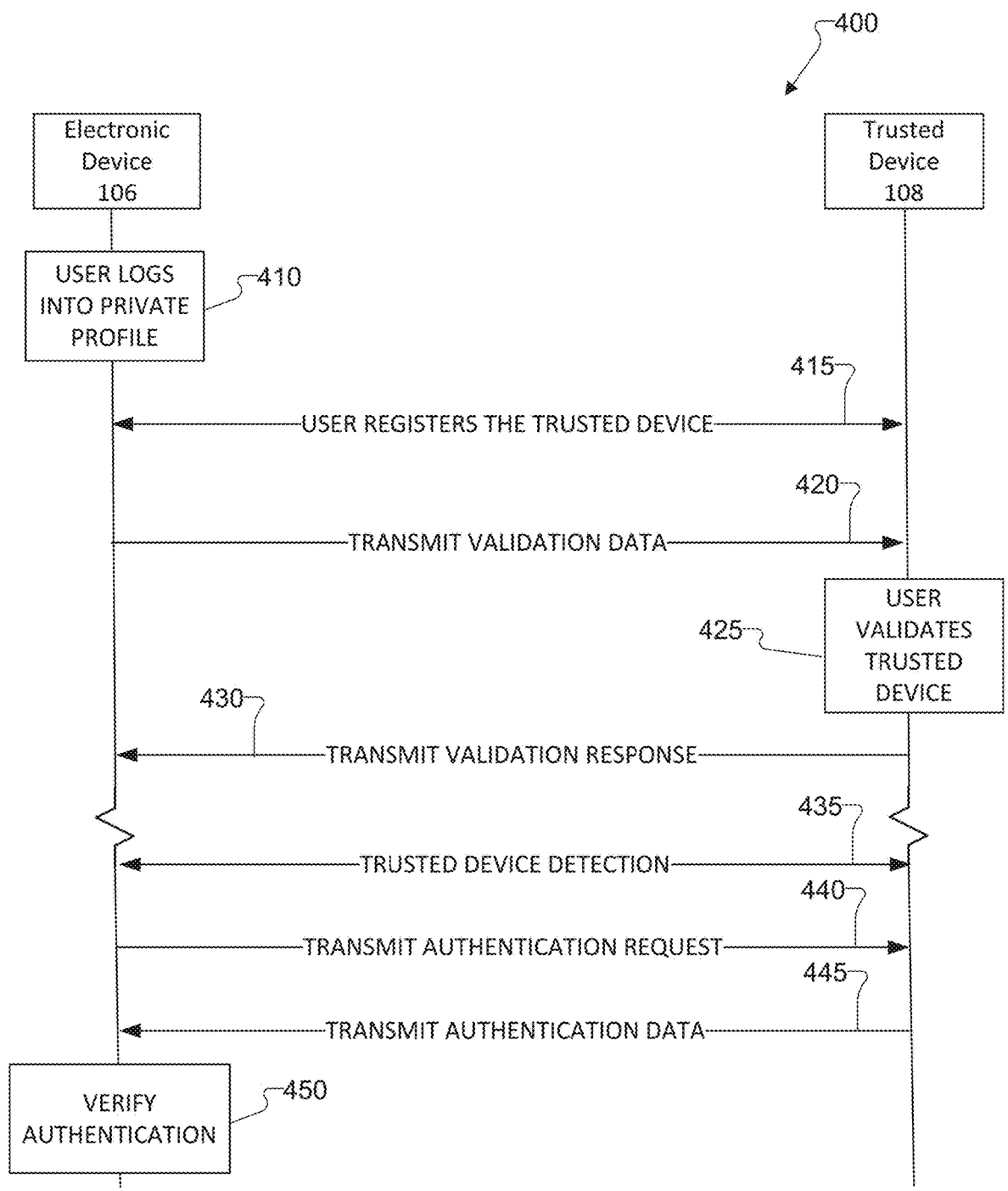
FIG. 4 illustrates a flow diagram registering an electronic device as a trusted device with an application running on another electronic device, and for detecting a trusted device as an authentication factor according to various embodiments of this disclosure.

FIG. 4 illustrates a sequence diagram 400 for registering an electronic device 200, such as electronic devices 108-114, as a trusted device 230 with an application 300 running on another electronic device 200, such as stationary computer 106, and for detecting a trusted device 230 as an authentication factor according to various embodiments of the disclosure. For the sake of simplicity, mobile phone 108 will be used as the trusted device 230 in this example, but it is understood that other electronic devices 110-114 may also be registered as trusted devices 230. While the signal diagram depicts a series of sequential signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a wearable device and an electronic device.

In operation 410, the user creates a private user profile 304 of an application 300 on stationary computer 106 or logs into an existing private user profile 304 with an existing authentication factor. The user chooses to register (or associate) a trusted device 230 (or two or more trusted devices 230 in the case of multifactor authentication) with the private user profile 304 as a new authentication factor.

In operation 415, the user registers the mobile phone 108 as a trusted device 230 associated with the private user profile 304. The registration includes identifying the mobile phone 108. In some embodiments, the user establishes authentication settings on the stationary computer 106 including, but not limited to, setting a proximity or directionality relative to the stationary computer 106 for use of the mobile phone 108 as an authentication factor. In some embodiments, the application 300 may establish such authentication settings.

In operation 420, the application 300 causes the stationary computer 106 to transmit validation data to the mobile phone 108. For example, the validation data may include a request for confirmation that the user wishes to associate the mobile phone 108 with the private user profile 304 as a trusted device 230. The validation data may additionally include a request for another authentication factor, such as a password, biometric data, or other form of identification data.

In operation 425, the user validates the mobile phone 108 as a trusted device 230. For example, the user responds to a confirmation dialog on mobile phone 108 by clicking a button. In some embodiments, the confirmation dialog requires the user to enter an authentication factor, such as a password, biometric data, or other identification data for validation.

In operation 430, the mobile phone 108 sends the results of the validation request back to the stationary computer 106. If the validation was successful, the application 300 on the stationary computer 106 registers the mobile phone 108 as a trusted device 230 associated with the private user profile 304.

In operation 435, the stationary computer 106 communicates with the mobile phone 108 to establish a communication connection with mobile phone 108 so that mobile phone 108 may function as an authentication factor. For example, operation 435 may include establishing a Bluetooth®, Wi-Fi Direct®, or NFC connection between stationary computer 106 and mobile phone 108.

In operation 440, the application 300 may cause the stationary computer 106 may transmit an authentication request to the mobile phone 108. For example, the application 300 may request an identifier of the mobile phone 108 to confirm that it is the trusted device 230 associated with the user profile 304. In some embodiments, the authentication request may include a request for a confirmation by the user on the mobile phone 108, or for the user to enter another authentication factor, such as a password, into the mobile phone 108.

In operation 445, the mobile phone 108 sends the results of the authentication request back to the application 300 on stationary computer 106. In operation 450, the application 300 verifies the authentication data sent by the mobile phone 108. If the authentication is successful, the application 300 allows access to the private user profile 304.

Figure 5:
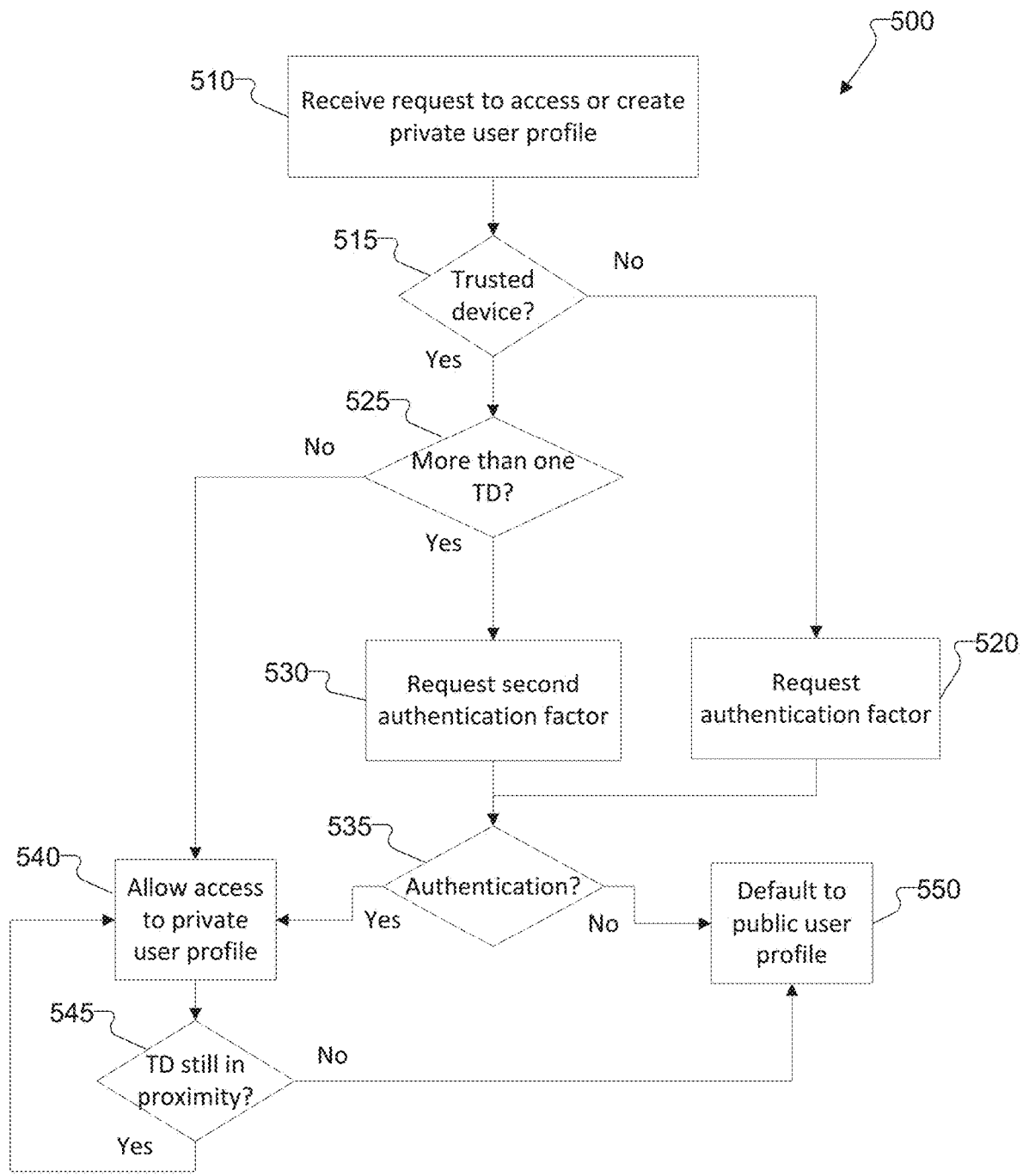
FIG. 5 illustrates a flow diagram of a method for accessing a private user profile of an application according to various embodiments of this disclosure.

FIG. 5 illustrates a flow diagram of a method 500 for accessing a private user profile 304 of an application 300 according to embodiments of the present disclosure. For example, this method may be performed by an application 300 running on an electronic device 200, which in some embodiments is a stationary computer 106. It is understood, however, that the method may be performed on any other suitable device, such as a mobile phone 108.

Beginning at block 510, the application receives a request to access a private user profile 304 or to create a new private user profile 304. For example, the application 300 may receive a selection from a user of a private user profile 304 that the user wishes to log into.

At decision block 515, the application 300 searches for trusted devices 230 associated with the selected private user profile 304 within a proximity (e.g., proximity 118) of the electronic device 200 on which the application 300 is running. For example, the application 300 may cause the electronic device 200 to search for devices using a short range wireless communications protocol such as Bluetooth®, Wi-Fi Direct®, or NFC. If no trusted devices 230 are detected within the predetermined proximity, the method 500 proceeds to block 520. In some embodiments, the presence of more than one trusted device 230 may be required to authenticate. In such embodiments, if less than all of the required trusted devices 230 are detected, the method 500 proceeds to block 520. If one or more trusted devices 230 (or at least the required number of trusted devices 230) are detected within the predetermined proximity, the method 500 proceeds to decision block 525.

At block 520, the application 300 requests that the user provide an authentication factor (e.g., a password, fingerprint scan, or the like) associated with the selected user profile 304. The method 500 then proceeds to decision block 535, described further below.

At decision block 525 the application 300 determines whether more than one trusted device 230 (or more than the required number of trusted devices 230) is detected within the predetermined proximity. If only one trusted device 230 (or only the required number of trusted devices 230) is detected, authentication is complete and the method 500 proceeds to block 540, described further below. If more than one trusted device 230 (or more than the required number of trusted devices 230) is detected, the method 500 proceeds to block 530.

At block 530, the application 300 requests that the user provide a second authentication factor (e.g., a password, fingerprint scan, or the like) associated with the selected user profile 304. In some embodiments, the proximity of another trusted device 230 that is already associated with the electronic device 200 may be used as an authentication factor. In some embodiments, the application 300 requests that the user provide the authentication factor via the electronic device 200 on which the application 300 is running. In other embodiments, the application 300 requests that the user provide the authentication factor via the trusted device 230 associated with the private user profile 304.

At decision block 535, the application 300 checks the validity of the provided authentication factor. If the authentication factor is valid, then authentication is successful and the method 500 proceeds to block 540. If the authentication factor is not valid, authentication fails and the method 500 proceeds to block 550.

At block 540, the application 300 allows access to the selected private user profile 304 and to any sensitive data contained within the selected private user profile 304.

At decision block 545, the application 300 may optionally periodically check whether the trusted device 230 associated with the selected private user profile 304 is still within the predetermined proximity of the electronic device 200. If the trusted device 230 is still present, the method 500 returns to block 540 and continues to allow access to the selected private user profile 304. If the trusted device 230 is no longer present, the method 500 proceeds to block 550.

At block 550, the application 300 allows access to the default, or public, user profile 302. As described above, the default user profile 302 does not have access to the sensitive information contained in any private user profiles 304, and may additionally refrain from storing any sensitive information provided by a user while logged in to the default user profile 302.

Figure 6:
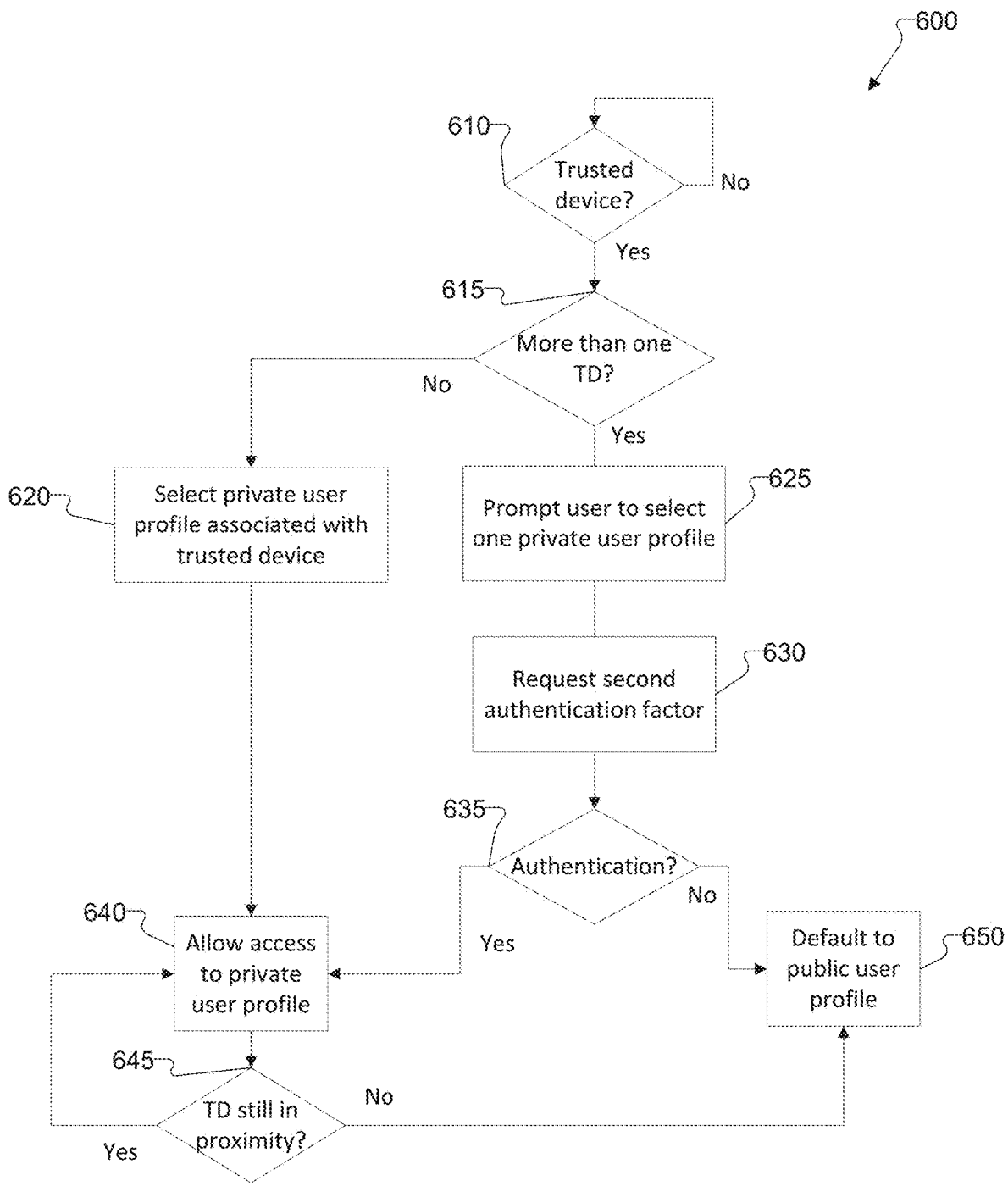
FIG. 6 illustrates a flow diagram of a method for automatically accessing a private user profile 304 of an application according to according to various embodiments of this disclosure.

FIG. 6 illustrates a flow diagram of a method 600 for automatically accessing a private user profile 304 of an application 300 according to embodiments of the present disclosure. For example, this method may be performed by an application 300 running on an electronic device 200, which in some embodiments is a stationary computer 106. It is understood, however, that the method may be performed on any other suitable device, such as a mobile phone 108.

Beginning at decision block 610, the application 300 periodically searches within a predetermined proximity (e.g., proximity 118) of the electronic device 200 on which the application 300 is running for trusted devices 230 (e.g., a mobile phone 108, a virtual or augmented reality wearable device 110) associated with private user profiles 304. For example, the application 300 may cause the electronic device 200 to search for devices using a short range wireless communications protocol such as Bluetooth®, Wi-Fi Direct®, or NFC. This may occur when the application 300 is launched. If no trusted devices 230 are detected within the predetermined proximity, the method 600 continues to search periodically for trusted devices 230. In some embodiments, the presence of more than one trusted device 230 may be required to authenticate. In such embodiments, if less than all of the required trusted devices 230 are detected, the method 600 continues to search periodically for the remaining required trusted devices 230. Upon detection of one or more trusted devices 230 (or at least the required number of trusted devices 230) within the predetermined proximity, the method 600 proceeds to decision block 615.

At decision block 615 the application 300 determines whether more than one trusted device 230 (or more than the required number of trusted devices 230) is detected within the predetermined proximity. If only one trusted device 230 (or only the required number of trusted devices 230) is detected, the method 600 proceeds to block 620. If more than one trusted device 230 (or more than the required number of trusted devices 230) is detected, the method 600 proceeds to block 625, described further below.

At block 620, when only one trusted device 230 (or only the required number of trusted devices 230) associated with a private user profile 304 is detected within the predetermined proximity, the application 300 automatically selects the private user profile 304 associated with the detected trusted device(s) 230. Authentication is complete, and the method 600 proceeds to block 640, described further below.

At block 625, when more than one trusted device 230 (or more than the required number of trusted devices 230) associated with a private user profile 304 is detected within the predetermined proximity, the application 300 prompts the user to select from among the private user profiles 304 whose associated trusted devices 230 are detected. For example, the application 300 may display a menu 306 and highlight the appropriate private user profiles 304. Upon receiving a selection of a private user profile 304 in response to the prompt, the method 600 proceeds to block 630.

At block 630, the application 300 requests that the user provide a second authentication factor (e.g., a password, fingerprint scan, or the like) associated with the selected user profile 304. In some embodiments, the proximity of another trusted device 230 that is already associated with the electronic device 200 may be used as an authentication factor. In some embodiments, the application 300 requests that the user provide the authentication factor via the electronic device 200 on which the application 300 is running. In other embodiments, the application 300 requests that the user provide the authentication factor via the trusted device 230 associated with the private user profile 304.

At decision block 635, the application 300 checks the validity of the provided authentication factor. If the authentication factor is valid, then authentication is successful and the method 600 proceeds to block 640. If the authentication factor is not valid, authentication fails and the method 600 proceeds to block 650.

At block 640, the application 300 allows access to the selected private user profile 304 and to any sensitive data contained within the selected private user profile 304.

At decision block 645, the application 300 may optionally periodically check whether the trusted device 230 (or the multiple required trusted devices 230) associated with the selected private user profile 304 is still within the predetermined proximity of the electronic device 200. If the trusted device 230 (or the multiple required trusted devices 230) is still present, the method 600 returns to block 640 and continues to allow access to the selected private user profile 304. If the trusted device 230 is no longer present, the method 600 proceeds to block 650.

At block 650, the application 300 allows access to the default, or public, user profile 302. As described above, the default user profile 302 does not have access to the sensitive information contained in any private user profiles 304, and may additionally refrain from storing any sensitive information provided by a user while logged in to the default user profile 302.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of security authorization on an electronic device, the method comprising:
   detecting whether a trusted device is present in proximity to the electronic device, wherein the trusted device is associated with a user profile of an application executed on the electronic device, and wherein the user profile includes access to private information;
   sending, to the trusted device, a request for activation of a confirmation prompt before allowing access to the user profile; and
   allowing access to the user profile in response to activation of the confirmation prompt and detecting that the trusted device is present in proximity to the electronic device.

2. The method of claim 1, wherein the detecting whether a trusted device is present is performed in response to receiving a request through the application to access the user profile associated with the trusted device.

3. The method of claim 1, wherein detecting whether the trusted device is present in proximity to the electronic device comprises detecting whether the trusted device is within a predetermined distance of the electronic device.

4. The method of claim 1, wherein detecting whether the trusted device is present in proximity to the electronic device comprises detecting whether the trusted device is detected in a predetermined direction from the electronic device.

5. The method of claim 1, further comprising:
in response to detecting a presence of a plurality of trusted devices in proximity to the electronic device, requesting an additional authentication factor associated with the user profile before allowing access to the user profile.

6. The method of claim 5, further comprising requesting selection of the user profile from a plurality of user profiles, wherein each user profile of the plurality of user profiles is associated with at least one of the plurality of trusted devices.

7. The method of claim 1, further comprising automatically selecting the user profile from among a plurality of user profiles based on the association between the user profile and the trusted device.

8. An electronic device comprising:
a processor;
a transceiver; and
a memory containing an application,
wherein the processor is configured to:
control the transceiver to detect whether a trusted device is present in proximity to the electronic device, wherein the trusted device is associated with a user profile of an application executed on the electronic device, and wherein the user profile includes access to private information contained in the memory,
control the transceiver to send, to the trusted device, a request for activation of a confirmation prompt before allowing access to the user profile; and
control the application to allow access to the user profile in response to activation of the confirmation prompt and detecting that the trusted device is present in proximity to the electronic device.

9. The electronic device of claim 8, wherein the processor is further configured to:
control the transceiver to receive a request through the application to access the user profile associated with the trusted device, and
in response to the request, control the transceiver to perform the detecting whether a trusted device is present.

10. The electronic device of claim 8, wherein the processor is further configured to recognize the detecting of the trusted device within a predetermined distance of the electronic device.

11. The electronic device of claim 8, wherein the processor is further configured to recognize the detecting of the trusted device in a predetermined direction from the electronic device.

12. The electronic device of claim 8, wherein the processor is further configured to:
in response to the transceiver detecting a presence of a plurality of trusted devices in proximity to the electronic device, control the transceiver to request an additional authentication factor associated with the user profile before controlling the application to allow access to the user profile.

13. The electronic device of claim 12, wherein the processor is further configured to control the application to request selection of the user profile from a plurality of user profiles, wherein each user profile of the plurality of user profiles is associated with at least one of the plurality of trusted devices.

14. The electronic device of claim 8, wherein the processor is further configured to automatically select the user profile from among a plurality of user profiles based on the association between the user profile and the trusted device.

15. A non-transitory computer readable medium embodying a computer program, the computer program comprising computer readable program code that when executed causes at least one processor of an electronic device to:
detect whether a trusted device is present in proximity to the electronic device, wherein the trusted device is associated with a user profile of an application executed on the electronic device, and wherein the user profile includes access to private information;
send, to the trusted device, a request for activation of a confirmation prompt before allowing access to the user profile; and
allow access to the user profile in response to activation of the confirmation prompt and detecting that the trusted device is present in proximity to the electronic device.

16. The non-transitory computer readable medium of claim 15, wherein the detecting whether a trusted device is present is performed in response to receiving a request through the application to access the user profile associated with the trusted device.

17. The non-transitory computer readable medium of claim 15, wherein the computer readable program code when executed further causes at least one processor to:
in response to detecting a presence of a plurality of trusted devices in proximity to the electronic device, request an additional authentication factor associated with the user profile before allowing access to the user profile.

18. The non-transitory computer readable medium of claim 15, wherein the computer readable program code when executed further causes at least one processor to:
automatically select the user profile from among a plurality of user profiles based on the association between the user profile and the trusted device.

\* \* \* \* \*